US011647076B2

(12) United States Patent
Croxford et al.

(10) Patent No.: US 11,647,076 B2
(45) Date of Patent: May 9, 2023

(54) METHOD AND SYSTEM FOR PROVIDING AUGMENTED REALITY DISPLAYS

(71) Applicant: Arm Limited, Cambridge (GB)

(72) Inventors: Daren Croxford, Cambridge (GB); Roberto Lopez Mendez, Cambridge (GB); Samuel Marc Town, Cambridge (GB)

(73) Assignee: Arm Limited, Cambridge (GB)

( * ) Notice: Subject to any disclaimer, the term of this patent is extended or adjusted under 35 U.S.C. 154(b) by 238 days.

(21) Appl. No.: 17/164,101

(22) Filed: Feb. 1, 2021

(65) Prior Publication Data

US 2021/0258376 A1 Aug. 19, 2021

(30) Foreign Application Priority Data

Feb. 13, 2020 (GB) ...................................... 2001981

(51) Int. Cl.
*H04L 67/1074* (2022.01)
*G06T 19/00* (2011.01)
*H04L 67/1061* (2022.01)
*H04L 67/1087* (2022.01)
*H04L 67/52* (2022.01)

(52) U.S. Cl.
CPC ........ *H04L 67/1078* (2013.01); *G06T 19/006* (2013.01); *H04L 67/1063* (2013.01); *H04L 67/1089* (2013.01); *H04L 67/52* (2022.05); *H04N 2201/3245* (2013.01)

(58) Field of Classification Search
CPC . H04L 67/1078; H04L 67/52; H04L 67/1063; H04L 67/1089; G06T 19/006; H04N 2201/3245; H04M 2203/359
See application file for complete search history.

(56) References Cited

U.S. PATENT DOCUMENTS

| 2012/0243732 | A1* | 9/2012 | Swaminathan | ........ G06V 20/20 382/103 |
|---|---|---|---|---|
| 2014/0267234 | A1 | 9/2014 | Hook | |
| 2015/0188984 | A1* | 7/2015 | Mullins | .................. H04L 67/52 709/219 |
| 2017/0243403 | A1* | 8/2017 | Daniels | ................. G06T 19/006 |
| 2018/0300919 | A1* | 10/2018 | Muhsin | ................ H04L 63/083 |
| 2019/0197339 | A1* | 6/2019 | Han | ......................... G06F 9/50 |
| 2019/0325251 | A1 | 10/2019 | Lin | |
| 2021/0110191 | A1* | 4/2021 | Gruteser | ................ G06V 20/20 |

OTHER PUBLICATIONS

Schneider, Michael, Jason Rambach, and Didier Stricker, "Augmented Reality based on Edge Computing using the example of Remote Live Support", 2017 IEEE International Conference on Industrial Technology (ICIT), Published: 2017. (Year: 2017).*
GB Combined Search and Examination Report dated Aug. 12, 2020, GB Patent Application No. GB2001981.6.

* cited by examiner

*Primary Examiner* — Nam T Tran
(74) *Attorney, Agent, or Firm* — Vierra Magen Marcus LLP

(57) ABSTRACT

When providing augmented reality display to users in an environment, two or more electronic devices operable to analyse the environment for augmented reality display purposes that are near to each other share data and/or processing relating to the analysis of the environment for augmented reality display purposes, with each device then using the data it receives from the other device when providing an augmented reality display to a user.

19 Claims, 7 Drawing Sheets

METHOD AND SYSTEM FOR PROVIDING AUGMENTED REALITY DISPLAYS

BACKGROUND

The technology described herein relates to a system and method for providing an augmented reality (AR) display, and in particular to techniques for providing augmented reality display to users of portable devices in an environment.

When providing an augmented reality (AR) display, it is necessary for the environment that the augmented reality display is to be provided in respect of to be analysed, so as to be able to, for example, provide appropriate AR overlays on the environment that the user is viewing (and, e.g., determine whether an AR display should be provided at all). Such analysis of the environment typically comprises, for example, analysing images of the environment (e.g. using computer vision) to identify objects in the environment. It may also comprise analysing sounds in the environment.

FIG. 1 shows an exemplary operation for providing an augmented reality display in this manner.

As shown in FIG. 1, in a typical augmented reality operation, when it is desired to display an augmented reality display to a user of, e.g., a portable electronic device, such as a head-mounted display (HMD), after an initial "localisation" process 1 (to, e.g., determine the initial location of the device in the environment, download an appropriate map (if available), etc.), a process of analysing 6 the local environment of the device is performed.

As shown in FIG. 1, this analysis may include capturing both sounds (audio) 2 in the environment and images of the environment 3. It may also include determining the position and orientation 4 of the device in the environment (e.g. using appropriate satellite navigation (e.g. GPS), cellular network signals (e.g. 5G), and/or inertial tracking (e.g. using a gyroscope and/or accelerometer of the device)) (which may be combined with images of the environment to perform a simultaneous location and mapping (SLAM) analysis 5 to determine the location and orientation of the device in the environment).

Once this information about the environment that the device is present in (and, e.g., that the viewer of the device is viewing), etc., has been captured, the environment is analysed 6, and once the environment has been analysed, appropriate augmented reality application processing 7 is performed and, e.g., an appropriate augmented reality display (e.g. overlay) for display to the user may be rendered (generated). The augmented reality display is then displayed 9 on an appropriate display to the user, such as an appropriate head-mounted display (e.g. in combination with other sensory outputs such as audio signals and tactile feedback).

This will then be repeated appropriately as the user moves through the environment and as it is desired to provide an augmented reality display to the user in the environment.

In such an AR display process, in order to be able to provide an appropriate augmented reality display, it is necessary for the environment of the device that is providing the augmented reality display to be analysed. As shown in FIG. 1, this can comprise, for example, analysing images and sound captured from the environment, together with some form of navigation (location) determination, for example using SLAM.

The analysis of an environment that a portable device is present in for the purposes of augmented reality display can impose a relatively high processing burden on the device (and/or the device may not have the capability to process the environment at the required rate), in particular where the analysis is being done in a real-time manner, for example so as to provide a real-time (and varying in real-time) augmented reality display. This can correspondingly result in high power consumption, which may undesirably drain the device's battery (too) quickly.

While it could be possible to offload some of this processing from the device that is providing the augmented reality display to the "Cloud", the Applicants have recognised that that may not always be possible or desirable.

The Applicants believe therefore that there remains scope for improvements to the operation of augmented reality systems, and in particular in relation to the analysis of the environment that an augmented reality display is being displayed with respect to.

BRIEF DESCRIPTION OF THE DRAWINGS

A number of embodiments of the technology described herein will now be described by way of example only and with reference to the accompanying drawings, in which.

Like reference numerals are used for like elements throughout the figures, where appropriate.

DETAILED DESCRIPTION

Figure 1:
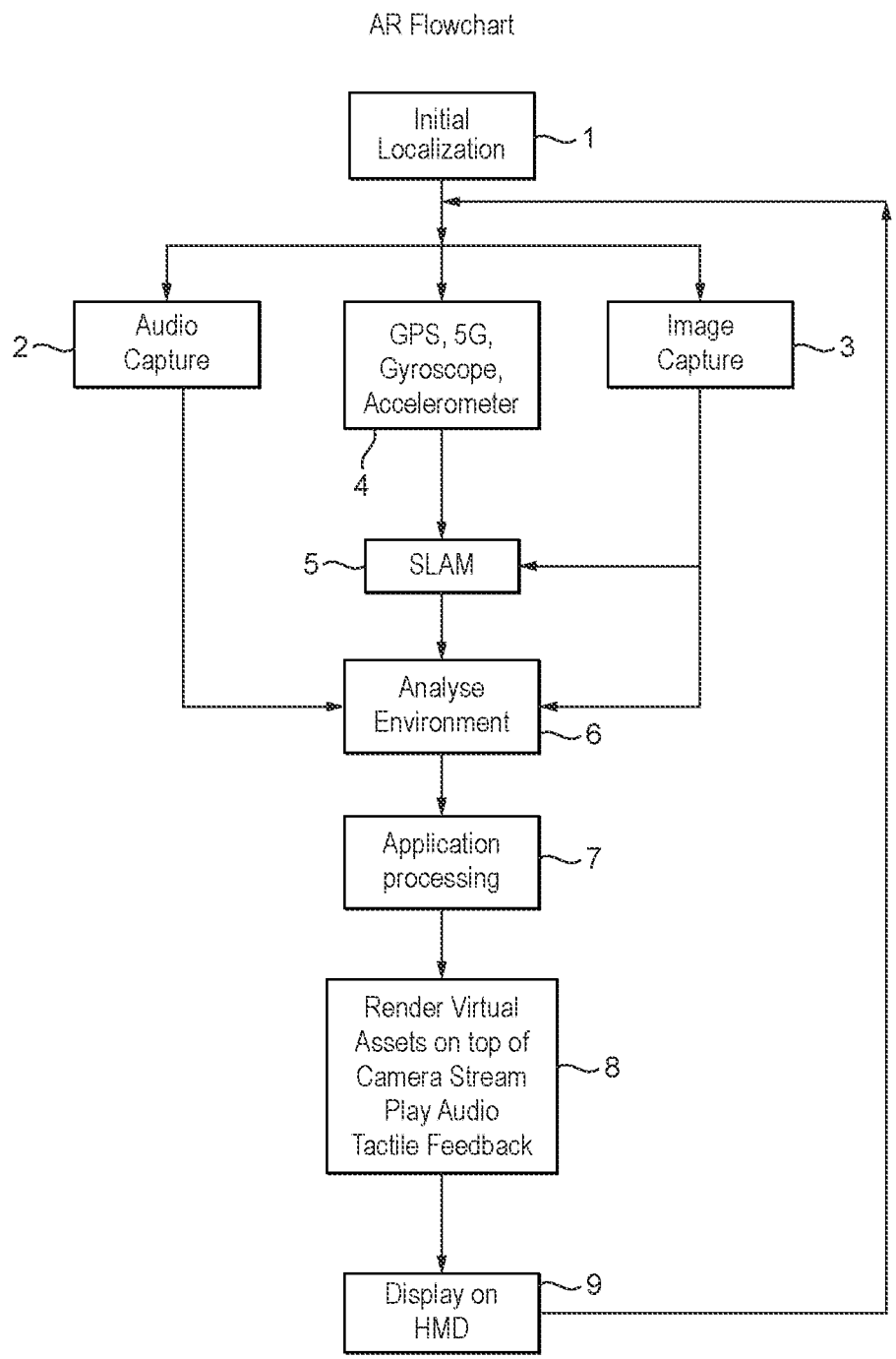
FIG. 1 shows schematically the operation when providing an AR display on an electronic device.

A first embodiment of the technology described comprises a method of operating a portable electronic device that is to provide an augmented reality display to a user in an environment, the method comprising:

determining whether there are any other electronic devices operable to analyse the environment for augmented reality display purposes that are near to the portable electronic device; and when it is determined that there is another electronic device operable to analyse the environment for augmented reality display purposes that is near to the portable electronic device:

determining whether to provide data relating to the analysis of the environment for augmented reality display purposes from the another electronic device to the portable electronic device; and when it is determined to provide data relating to the analysis of the environment for augmented reality display purposes from the another electronic device to the portable electronic device, providing data relating to the analysis of the environment for augmented reality display purposes from the another electronic device to the portable electronic device; and the portable electronic device using the provided data relating to the analysis of the environment for augmented reality display purposes when providing an augmented reality display to a user of the portable electronic device.

A second embodiment of the technology described comprises a portable electronic device that is operable to provide an augmented reality display to a user in an environment, the portable electronic device comprising:

a processing circuit configured to:
determine whether there are any other electronic devices operable to analyse the environment for augmented reality display purposes that are near to the portable electronic device; and
when it is determined that there is another electronic device operable to analyse the environment for augmented reality display purposes that is near to the portable electronic device:
determine whether to use data relating to the analysis of the environment for augmented reality display purposes from the another electronic device when the portable electronic device is operating to provide an augmented reality display to a user; and
when it is determined to use data relating to the analysis of the environment for augmented reality display purposes from the another electronic device, receive data relating to the analysis of the environment for augmented reality display purposes from the another electronic device; and
a processing circuit configured to provide an augmented reality display to a user of the portable electronic device using the data relating to the analysis of the environment for augmented reality display purposes received from the another electronic device.

A third embodiment of the technology described comprises a method of operating a system for providing augmented reality display to users in an environment, the system comprising:

a plurality of electronic devices operable to analyse an environment for augmented reality display purposes, including a plurality of portable electronic devices, each operable to provide an augmented reality display to a user in an environment;

the method comprising:
determining whether two or more of the electronic devices operable to analyse an environment for augmented reality display purposes are near to each other; and
when it is determined that two or more of the electronic devices operable to analyse an environment for augmented reality display purposes are near to each other:
determining whether to share data relating to the analysis of the environment for augmented reality display purposes between two or more of the two or more electronic devices operable to analyse an environment for augmented reality display purposes; and
when it is determined to share data relating to the analysis of the environment for augmented reality display purposes between two or more of the two or more electronic devices operable to analyse an environment for augmented reality display purposes, sharing data relating to the analysis of the environment for augmented reality display purposes between two or more of the two or more electronic devices operable to analyse an environment for augmented reality display purposes; and
one or more of the two or more electronic devices operable to analyse the environment for augmented reality display purposes using data relating to the analysis of the environment for augmented reality display purposes they have received when providing an augmented reality display to a user.

The technology described herein relates to augmented reality display, and in particular to the analysis of an environment for the purposes of augmented reality display.

In the technology described herein, when a portable electronic device is providing an augmented reality display, it is determined whether there are any other devices in the environment that are also operable to analyse the environment for the purposes of providing an augmented reality display, and, if so, it is then determined whether the devices should share data relating to the analysis of the environment for augmented reality display purposes. As will be discussed further below, such sharing of data relating to the analysis of the environment for augmented reality display purposes can reduce the processing burden on an individual device that is providing an augmented reality display, thereby facilitating (improved) augmented reality display on individual devices in an environment, for example.

The Applicants have recognised in this regard that it may be the case that there are plural devices within a given environment that may all be operating to provide an augmented reality display within the environment in question, and furthermore, that such spatially local devices will be likely to perform similar analysis of the environment, and thus generate and use data which is relevant to each other. Similarly, many objects in the physical world are unlikely to change significantly over time, such that, e.g., data relating to such objects derived by one device may be useable by other devices in or that enter the environment in question. Correspondingly, persistent virtual objects may exist for an environment which are applicable to many users, again such that, e.g., data relating to such objects derived by one device may be useable by other devices in or that enter the environment in question.

Thus, the Applicants have recognised that devices in the same environment may each have and/or be able to provide data that would be useful to other devices in the environment, such that the required analysis of the environment for the purposes of providing the augmented reality display can, in effect, be shared between the plural devices in the environment and, correspondingly, devices in the environment can avoid duplicating analysis and computation relative to each other. This will then have the effect of reducing the amount of analysis and processing (and thus, e.g., power consumption) to be performed by an individual device in the environment, whilst still providing that device (and other devices in the environment), with a more sophisticated and complex analysis of the environment for the purposes of providing their augmented reality display.

As will be discussed further below, the sharing (providing) of data relating to the analysis of the environment for the purposes of the augmented reality display could comprise sharing (providing) data that has already been generated (i.e. data from an existing analysis of the environment that already exists at the time the determination to share (provide) the data is made), or it could instead or additionally comprise first partitioning the processing of the analysis of the environment between the different devices, with each device then performing its respective part of the processing, before then sharing (providing) some or all of the data from the partitioned processing between the devices. Thus the technology described herein encompasses both providing data that a device already possesses, and distributing (partitioning) processing that is still to be performed between devices, before then sharing (providing) the results of that processing between the devices.

The environment for which the augmented reality display is being provided, and that is to be analysed in the technology described herein, can be any suitable and desired environment that it is desired for portable electronic devices to be able to provide an AR display in. In an embodiment, the environment is an indoor environment, such as a building or buildings (and in particular a large building such as an airport, train station, shopping mall, hospital, factory, etc.), or a vessel (such as a (large) ship). In an embodiment the environment is a high traffic and/or busy environment, such as an airport, train station or a shopping mall, e.g. where a complete analysis of the environment (e.g. face recognition of people within the environment) may be too great a burden for a single portable device. Other environments would, of course, be possible.

The portable electronic device can be any suitable portable electronic device that can provide an augmented reality display (and that can perform any "on-device" processing that is required for operation in the manner of the technology described herein). Thus it could, for example, comprise a mobile phone or tablet. In an embodiment, the portable electronic device comprises a wearable device, such as a head worn device, such as a headset, such a pair of glasses (e.g. AR glasses). In an embodiment, it is a head mounted display device (an Augmented Reality (AR) head mounted display (HMD)).

In an embodiment, the portable electronic device comprises an AR head mounted display, together with an associated mobile phone (or other processing unit). There may also be another wearable device, such as a bracelet or watch, to provide haptic (tactile) feedback.

Other forms of portable electronic device would, of course, be possible.

The portable electronic device should, and in an embodiment does, contain the necessary and desired components for operating in the manner of the technology described herein and in particular for providing an augmented reality display to a user and for performing analysis of an environment for that purpose. Thus the portable electronic device in an embodiment comprises an appropriate display (such as a screen or head-mounted display) for displaying augmented reality images (e.g. video) to a user, together with an appropriate processor or processors for providing the augmented reality display and for performing appropriate analysis of an environment for that purpose.

Correspondingly, the portable electronic device in an embodiment comprises appropriate sensors for capturing information about the environment for the purpose then of analysing the environment and providing an augmented reality display of the environment.

Thus, the portable electronic device should, and in an embodiment does, include an image sensor that is operable to take (capture) images of an environment in which the portable electronic device is located, in an embodiment in the form of a camera.

The portable electronic device may also correspondingly comprise a microphone for capturing sounds in the environment, and/or other sensors for capturing information about the environment, such as depth sensor (e.g. time of flight, structured light, stereo and radar, etc.).

The portable electronic device should, and in an embodiment does, also include an appropriate form of wireless communication system for communicating with other electronic devices, the "Cloud", etc., such as, and in an embodiment, one or more of, and in an embodiment all of: an appropriate Wi-Fi communication system; a cellular network communications system; and other short range wireless communication systems, such as Bluetooth. In an embodiment, the electronic devices support and can use the WiGig (60 GHz Wi-Fi) wireless communications protocol, e.g. in accordance with IEEE 802.11ad and IEEE 802.11ay.

As well as any components, circuits, functional units, etc., necessary for the particular operation in the manner of the technology described herein, the electronic devices can otherwise include any desired and suitable elements, circuits, components, etc. Thus the electronic devices may, and in an embodiment do, also comprise one or more of, and in an embodiment all of: a central processing unit (CPU) (a host processor), a graphics processing unit (GPU) (graphics processor), a display controller, a video processing unit (VPU), a neural network processor (NPU), a system bus, local storage, in an embodiment in the form of a memory, and a memory controller. The memory may comprise, e.g., a main memory of the device. (Thus, the electronic devices in an embodiment also comprise, and/or are in communication with, one or more memories and/or memory devices that store the data described herein, and/or software for performing the processes described herein.)

The another electronic device that the portable electronic device (potentially) receives data relating to the analysis of the environment from can correspondingly be any suitable and desired electronic device that is near to the portable electronic device (and able to be in communication with the electronic device).

In an embodiment, the another electronic device is a corresponding portable electronic device that is also operable to provide an augmented reality display of an environment to a user.

However, the another electronic device could also be an electronic device that is, e.g., present in the environment but is not "portable" (and that may, in itself, not operate to provide an AR display to a user), such as a device that is fixed in the environment (and in an embodiment, this is the case). Such fixed devices could, e.g., comprise security cameras, AR "hot spots", beacons, or nodes, Wi-Fi hot spots or nodes, etc., present in the environment that may also participate in the environment analysis and/or data sharing, etc.

The presence of another electronic device operable to analyse the environment for the purpose of providing an augmented reality display that is near to the portable electronic device can be determined and detected in any suitable and desired manner. For example, the portable electronic device that is to provide the augmented reality display could search for other suitable electronic devices that are nearby, for the purpose then of determining whether to request data relating to the analysis of the environment for the purposes of providing the augmented reality display. (The intention in this regard is that if the devices are determined to be near to each other, then it is likely that they will be able to communicate with each other (and, e.g., using little power), and are likely to have information of value to each other.)

In this case, the portable electronic device could, e.g., determine whether there are any electronic devices within a particular, e.g. threshold, range of the portable electronic device (e.g. based on an analysis of the positions of, and/or the exchange of position information between, the electronic devices). In this case, it will be determined, e.g., whether any (suitable) electronic devices are with a particular, in an embodiment selected, (threshold) distance of the portable electronic device that is to provide the augmented reality display. The particular, threshold, range (distance from the portable electronic device) could be fixed, but in an embodiment is variable in use (e.g. based upon the size and/or nature of the environment that the portable electronic device is present in). For example, in a very busy environment, a reduced range could be used.

Thus, in an embodiment, determining whether there are any other electronic devices operable to analyse the environment for augmented reality display purposes that are near to the portable electronic device comprises determining whether there are any electronic devices that are within a particular, in an embodiment selected, and in an embodiment predetermined, threshold distance (range) of the portable electronic device that is to provide the augmented reality display. The threshold distance (range) could be defined in terms of a specified (defined) distance, or could, e.g., be represented in another manner, for example, in accordance with whether the devices can communicate with each other using a given, in an embodiment selected, communications protocol. The determination could also be based on whether the devices are within the same particular, in an embodiment selected, in an embodiment defined, region or area within the environment, such as whether the devices are determined to be within the same room or other space or (defined) location within the environment.

In an embodiment, it is determined that there is another electronic device operable to analyse the environment for the purposes of augmented reality display that is near to the portable electronic device when the portable electronic device determines that it can communicate with the another electronic device using a particular, in an embodiment selected, short range wireless communication protocol (e.g. Bluetooth or a Wi-Fi protocol). This will then, in effect, trigger operation in the manner of the technology described herein when devices are in appropriate communications range of each other (as that can then be taken as an indication that the devices are within and (potentially) analysing the same environment).

Thus, an embodiment is for the operation in the manner of the technology described herein to be triggered when a device automatically detects another device as being within range in a particular, e.g., selected, e.g. predefined, short range wireless communication protocol (e.g. Bluetooth or Wi-Fi protocol) (and such that the devices can communicate directly with each other, independently of any system infrastructure, using the protocol in question).

Thus, in an embodiment, a "local" communication protocol(s) (such as Bluetooth/WiFi) is used to indicate whether the devices are near, but other arrangements, such as a cellular network signal, or information from a remote device, such as in the Cloud, could also or instead be used, if desired.

Other arrangements would, of course, be possible.

In an embodiment, the determination of whether another electronic device is near also takes account of one or more other factors, such as, and in an embodiment, one or more of, and in an embodiment all of: the location(s) of the electronic device or devices, the field(s) of view of the electronic device or devices, and the pose(s) (orientation(s)) of the device or devices. This will then allow, e.g., the location of the devices and/or which space, e.g. room, within the environment, the devices are in.

This information can be determined in any appropriate manner, for example using appropriate SLAM or other techniques. The location information could be provided by SLAM and/or using other navigation techniques, such as satellite navigation techniques, such as GPS, etc. For example, location could be provided based on location in a SLAM map or SLAM point cloud for the current location (with the portable electronic device then, e.g., using that information to determine the location of the other electronic device using its local SLAM map data), longitude and latitude information, location on a local map, etc.

Once it has been determined that there is another electronic device that is near to the portable electronic device, it is then determined whether to provide data relating to the analysis of the environment from the another electronic device to the portable electronic device (i.e. whether data relating to the analysis of the environment should be shared between the devices).

This determination can be based on any suitable and desired criteria. In an embodiment, it is based on one or more of, in an embodiment some of, and in an embodiment all of: the devices' (relative) locations in the environment; the device's (relative) fields of view (and/or facing directions) in the environment; whether the another electronic device already has data relating to the analysis of the environment that it can share (and in that case, e.g., and in an embodiment, the age of that data (whether it is a recent analysis of the environment or not), and/or a measure of the "trustworthiness" of that data (e.g. of the device that is providing the data); the capabilities of the another electronic device for analysing the environment and generating data in relation thereto (for example in terms of what capabilities the device has for analysing the environment, such as, and in an embodiment, the device's computing (process) capabilities; the device's sensor capabilities (e.g. range and/or accuracy), and/or its remaining battery level (and whether it is mains powered or not) (and again, e.g., a measure of the "trustworthiness" of any analysis performed by the device)).

This information may, e.g., already be known, e.g. based on an identification of the device(s) in question, and/or may be determined by appropriate exchange of information between the devices.

Other arrangements would, of course, be possible.

When it is determined to provide data relating to the analysis of the environment for the purposes of providing an augmented reality display from another electronic device to the portable electronic device, then data will be at least provided from the another electronic device to the portable electronic device. Thus, data will at least be provided from the another electronic device to the portable electronic device. In an embodiment, data relating to the analysis of the environment is provided in both "directions", i.e. data relating to the analysis of the environment is provided both from the another electronic device to the portable electronic device, and from the portable electronic device to the another electronic device. In the case where there are more than two electronic devices present in the environment and operable to provide and exchange data in the manner of the technology described herein, then all of the devices that are suitably present and operable in the environment may, and in an embodiment do, exchange data relating to the analysis of the environment.

The data relating to the analysis of the environment for the purposes of providing an augmented reality display that is provided from one electronic device to the other can be any suitable and desired data relating to the environment for the purposes of the augmented reality display. Thus it may comprise, for example, one or more of, and in an embodiment all of: 3D environment modelling data; object identification; location and/or movement data; data relating to virtual objects to be displayed for the environment; data relating to the analysis of images of the environment (e.g. identifying objects in the environment); data relating to the analysis of sounds in the environment (e.g. relating to the identification of particular sounds in the environment); data relating to one or more of: location, object type, object orientation, colour, lighting, surface normal, size label, etc.; object 3D representation(s); data relating to the relationship(s) between objects; data relating to materials in the environment; 3D object segmentation; context information; application requirements; communication data; etc.

The data relating to the analysis of the environment that is provided from one electronic device to the other is in an embodiment (at least) recent (current) data relating to the analysis of the environment, e.g. that has been generated within a particular, in an embodiment selected, in an embodiment predefined, (preceding) period of time. In particular real-time data relating to "current" activity within the environment is in an embodiment exchanged between the devices.

It would also be possible to exchange data relating to longer term aspects of the environment if desired. For example, data relating to persistent virtual objects in the environment could be transferred from one device to another in a corresponding manner (and in an embodiment, that is done). This may be advantageous since, for example, some persistent virtual objects may have a large data size, and so it may be more efficient to deliver those objects to devices from other devices in the environment, if available, rather than the devices downloading such persistent virtual objects individually to each device from the cloud (for example).

As discussed above, providing data relating to the analysis of the environment from the another electronic device to the portable electronic device comprises in an embodiment providing already existing analysis (data) that has been done by the another electronic device to the portable electronic device. This could be appropriate, e.g., where the portable electronic device enters an environment that the another electronic device is already present in and has already performed some analysis of, and/or in the case where the portable electronic device is entering an environment that the another electronic device is leaving, but the other electronic device has data relating to the analysis of the environment that the portable electronic device is entering. In this case therefore the another electronic device will provide data relating to the analysis of the environment that it already possesses to the portable electronic device.

(In this latter case, a user leaving one environment that they have analysis data of will, in effect, encounter another user that is entering the environment, and so there may be an exchange of data between users as one user enters and the other user leaves the environment in question.)

In an embodiment, the providing of data relating to the analysis of the environment for augmented reality display purposes from the another electronic device to the portable electronic device comprises first determining whether one or both of the portable electronic device and the another electronic device should perform an analysis of the environment for augmented reality display purposes, and then allocating the processing relating to the analysis of the environment for the purposes of providing an augmented reality display to one or both of the another electronic device and the portable electronic device on the basis of the determination, with the another electronic device and/or the portable electronic device then performing their so-allocated processing relating to the analysis of the environment (if any), and then sending the resulting analysis data from that processing (if any) to the other device.

In this case, already existing data on the device or devices could also be shared between the devices, as well as any additional data generated as a result of the new analysis of the environment.

In this case, it could be determined that only one of the devices is to perform the analysis of the environment (and then provide data from that analysis to the other device), but in an embodiment both devices perform an analysis of the environment with the analysis (processing) being subdivided (partitioned) between the different devices. (Thus in the latter case, the operation will comprise distributing the processing burden of analysing the environment between devices that are present in the environment, and then those devices sharing the results of their respective processing.)

The analysis of the environment for augmented reality display purposes can comprise any suitable and desired analysis for that purpose, e.g. so as to be able to display appropriate AR overlays on the user's view of the environment. Thus, the analysis in an embodiment comprises (capturing and) analysing images of the environment, e.g. to identify objects in the environment. This may be done, e.g. using appropriate computer vision, object recognition, and and/or image analysis techniques.

The analysis of the environment may also comprise analysing sounds in the environment. It may also include using SLAM (simultaneous location and mapping) to identify the location, etc., of the device(s) in the environment.

The determination of which device or devices should analyse the environment, and/or how to partition (allocate) the processing between the devices, can be based on any suitable and desired criteria.

In an embodiment, it is based on one or more of, in an embodiment some of, and in an embodiment all of: the devices' (relative) locations in the environment; the device's (relative) fields of view (and/or facing directions) in the environment; the capabilities of the devices for analysing the environment and generating data in relation thereto (for example in terms of what capabilities the device has for analysing the environment, such as, and in an embodiment, the device's computing (processing) capabilities, the device's sensor capabilities (e.g. range and/or accuracy), and/or its remaining battery level (and whether it is mains powered or not); the analysis to be performed (e.g. the processing requirements for the analysis and/or the complexity of the processing task that is required, etc.); and a measure of the "trustworthiness" of any analysis performed by the devices (of the devices).

(As discussed above, this information may, e.g., already be known, e.g. based on an identification of the device(s) in question, and/or may be determined by appropriate exchange of information between the devices.)

In an embodiment, the determination of which device or devices should analyse the environment, and/or how to partition (allocate) the processing between the devices, is based on whether the devices have overlapping fields of view or not. In the event that the devices have overlapping fields of view, then the processing of the analysis of the environment (for the overlapping field of view) is in an embodiment then distributed between the devices having the overlapping field of view based on the respective capabilities of the devices and/or the processing that is required, as discussed above.

Other arrangements would, of course, be possible.

The data relating to the analysis of the environment (whether already existing data or newly generated data) can be sent (exchanged) between the devices in any suitable and desired manner.

In an embodiment, the data is exchanged between the respective devices directly (as a peer-to-peer operation between the respective devices directly) (and without involving any communications system (network) infrastructure). This may help to minimise latency, power consumption and the impact of any wider network issues in the environment.

This may be done as desired, e.g. using an appropriate direct device-to-device wireless communication link, such as Bluetooth, or WiFi.

In an embodiment, the data is exchanged using the WiGig (60 GHz Wi-Fi) wireless communications protocol (as discussed above). This will facilitate higher data transfer rates (and accordingly reduce the cost of communicating the data between the devices).

It would also be possible, if desired, for the exchange of data to take place via some form of communication system/network infrastructure, such as a local Wi-Fi node that both the devices are in communication with.

It would also, if desired, be possible to provide some form of more centralised management and control of the data sharing (and any "work" partitioning, if appropriate), e.g. via a centralised and/or external controller that, e.g., receives information from respective portable (or other) devices, and correspondingly distributes that data to the devices (and/or partitions the environment analysis between the devices). This could be in addition to or instead of direct peer-to-peer sharing.

In this case therefore, the another electronic device would be, e.g. some form of "central" distributing electronic device, e.g. that is fixed in the environment, e.g. that portable electronic devices entering the environment can communicate with, and which centralised control device would then receive analysis data from electronic devices in the environment and distribute that data to other devices in the environment, and/or allocate environment analysis work to the devices in the environment, as appropriate.

In this case, each device again in an embodiment communicates with the "central" controlling/distributing device over an appropriate short range wireless communication link, such as Wi-Fi or Bluetooth.

In this case, the centralised/external management could take place in the cloud, and/or be performed by a local control device (e.g. control beacon or node). Thus, for example, the devices could communicate with a server in the Cloud (e.g. via a cellular network), and the server could allocate work, distribute data, etc.

In this case, the centralised/controller device could curate a "current" (latest) model of the environment, with devices reporting the environment data they are generating to the controller, and existing environment data being fetched from the controller, rather than peer-to-peer.

In an embodiment, as well as exchanging the data between devices in the environment, data that is generated is also stored out to the cloud, for example for use by other users (remote actors) who are, e.g. visiting the environment "virtually".

Once the portable electronic device has received data relating to the analysis of the environment from another device, it can and then will use that data when providing an augmented reality display to a user.

The data provided from the other electronic device can be used when providing the augmented reality display in any suitable and desired manner, e.g., and in an embodiment, in dependence upon the nature of the data that is received.

For example, data relating to the identification of objects in the environment could then be used to derive and render appropriate augmented reality overlays for displaying in relation to those identified objects in the environment. Other arrangements would, of course, be possible.

It should be appreciated here that the electronic device may or may not provide an augmented reality display to its user based on the received data relating to the analysis of the environment. For example, the electronic device may determine that no augmented reality display is currently required based on the environment information that it receives (and that it, e.g., generates itself). For example, it may be determined that there is nothing to be displayed to the user given their current location in the environment.

Thus in an embodiment the portable electronic device uses the received data relating to the analysis of the environment from the another device to determine whether to provide an augmented reality display to a user, and then, when it is determined to provide an augmented reality display to a user, provides an augmented reality display to the user, in an embodiment using the received data relating to the analysis of the environment from the another device or devices when providing that augmented reality display to a user.

The augmented reality display that is provided to the user can take any suitable and desired form. It in an embodiment comprises displaying an augmented reality overlay (e.g. heads-up display) to the user, e.g. in their view of the environment, and/or on a camera feed of the environment being displayed to the user. This may be done, e.g., and in an embodiment, via a suitable display of the portable device (e.g. via the display of an AR head mounted display).

It would also be possible to provide other forms of AR feedback, such as audio signals and/or haptic (tactile) feedback (e.g. vibration, e.g. via a separate wearable device such as a watch or bracelet).

Thus the augmented reality display that is provided to the user in an embodiment comprises displaying (outputting) some form of image to the user, but it could also comprise providing another form(s) of augmented reality output, such as an audio output. That may be instead of or in addition to displaying an image or images to the user. Hence, the technology described herein should (and in an embodiment does) produce some useful output data as described herein.

In an embodiment, the portable electronic device is operable to control (and e.g. weight) its use of data received from another electronic device based on one or more factors or criteria, such as, and in an embodiment, the relative "trustworthiness" of the device from which the data is received and/or the (relative) age (freshness) of the data (how recently it has been generated) that is received, e.g., and in an embodiment, so as to place more weight on, make more use of, and/or prefer, data that is more recent and/or that is from more trusted devices. It would also be possible, e.g., to check data of, e.g. less trusted, devices, to determine whether that data is suitable to use or not.

As discussed above, in an embodiment a device's "trustworthiness" is taken into account when sharing data, e.g. and in an embodiment, such that data from more trusted devices is favoured.

In this case, respective devices are in an embodiment allocated some form of "trustworthiness" rank or measure for the purposes of the augmented reality analysis and display, and then that measure is used as an indication of the device's trustworthiness. A device could be allocated a fixed, predetermined trustworthiness rating, or it would be possible for some or all devices to have a trustworthiness rating that can be set and varied in use.

The trustworthiness rating of a device can be set in any suitable and desired manner and based on any suitable and desired criteria. For example, electronic devices that are part of a fixed infrastructure could be allocated a higher (and e.g.

fixed) trustworthiness rating, whereas portable devices that will move in and out of the environment could be allocated a lower trustworthiness rating and/or a variable trustworthiness rating. For example, particular, selected, devices, such as fixed nodes or beacons that distribute "official" models of the environment, could be certified as having "maximum" trust and used in preference to peer data, e.g. particularly in high traffic environments (airport, shopping mall etc.).

The trustworthiness ratings of given devices could be particular to individual devices (such that each device will have its own trustworthiness ranking for other devices that it has encountered), and/or the trustworthiness ratings could be shared between multiple devices, e.g. such that all devices in the system use a common set of trustworthiness ratings for the devices in the system (e.g. maintained by a common, e.g. control device).

In an such embodiment, one or more of the electronic devices are operable to and operate to check the trustworthiness of other devices, and to, e.g., and in an embodiment, adjust the trustworthiness rating of those devices in dependence upon those checks. For example, and in an embodiment, a device could check data received from another device (e.g. by performing the corresponding analysis itself and then comparing the results), to determine whether the other device's analysis is trustworthy or not (and how trustworthy that analysis is). The checking device could then modify the other device's trustworthiness rating if and as appropriate.

Such checking may, e.g., only or preferentially be performed by fixed (and thus more capable and/or more trustworthy) devices in the environment, such as an appropriate control device (node or nodes) in the environment.

Thus, In addition to using analysing an environment to generate new environment data, devices may dedicate a portion of their available environment analysis capacity to validate environment data received from other devices. If significant differences are detected (e.g. the data is poor quality or has been maliciously modified), the device may choose to discard all data received from that device, mark the device as untrusted, report the trust score centrally to allow score tracking of good/bad device data sources, etc.

A comparison of data received from plural different devices, e.g. to identify differences, could also or instead be performed, e.g. to identify lower quality devices, and/or to focus data validation analysis on areas of the environment with more significant differences.

The operation in the manner of the technology described herein can be combined with other AR techniques, such as an AR Cloud deployment, if desired.

The augmented reality operation of the technology described herein can be implemented in any suitable and desired fashion.

In an embodiment, the technology described herein is implemented by means of an appropriate "augmented reality" application executing on the portable electronic device, which application is operable to perform and/or to cause to be performed the various steps and processes of the technology described herein. In this case, the application may, e.g., be activatable by a user when the user wishes to use an AR display in an environment using the portable electronic device.

Although the technology described herein has been described above primarily with reference to the sharing of data for the purposes of providing an augmented reality display between two devices, as will be appreciated by those skilled in the art, data relating to the analysis of an environment for the purposes of providing an augmented reality display (and the processing relating to that analysis) could be shared (exchanged) between more than two devices, if desired, e.g., and in an embodiment, in the case where there are more than two appropriate devices present in the environment in question. For example, data from one device could be provided to plural other devices, and/or three or more devices could share the processing and/or share (exchange) data with each other.

In this case, the sharing of data/processing between the plural devices could be and is in an embodiment, performed and determined in the manner discussed above. Thus, for example, the relative capabilities and/or locations and/or orientations (fields of view), etc., of the various different devices could be considered and used to, e.g., distribute the processing relating to the analysis of the environment for the purposes of augmented reality display between the plural devices, with the devices then sharing the results of their analysis appropriately.

Thus, in an embodiment, there are three or more electronic devices operable to analysis the environment for the purposes of an augmented reality display that are present in the environment, and the processing relating to the analysis for the purposes of the augmented reality display is distributed between those three or more devices, with the devices then sharing the resulting data relating to the analysis of the environment for the purposes of providing an augmented reality display to their respective users.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages of the technology described herein may be embodied as a processing stage circuit, e.g., in the form of one or more fixed-function units (hardware) (processing circuits), and/or in the form of programmable processing circuits that can be programmed to perform the desired operation. Equally, any one or more of the processing stages and processing stage circuits of the technology described herein may comprise a separate circuit element to any one or more of the other processing stages or processing stage circuits, and/or any one or more or all of the processing stages and processing stage circuits may be at least partially formed of shared processing circuitry.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a non-transitory computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The technology described herein and the present embodiments relate in particular to the sharing of environment analysis data for the purposes of providing an augmented reality display to users of portable electronic devices in an environment.

Figure 2:
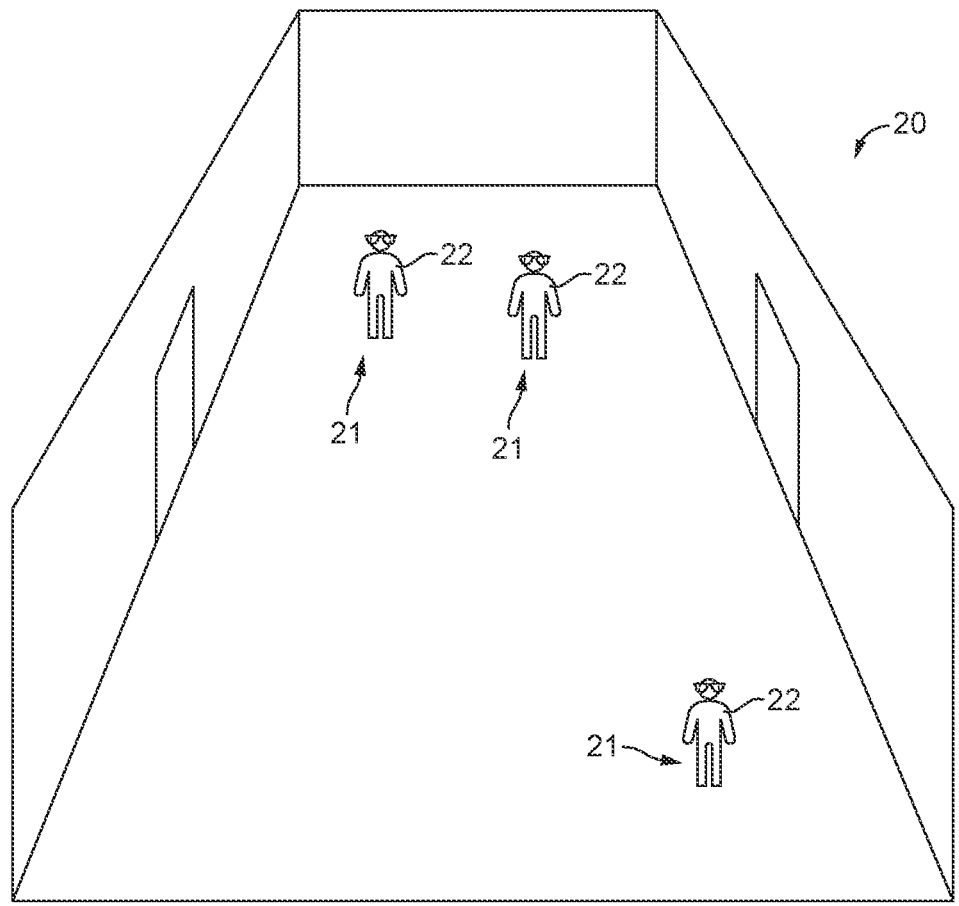
FIG. 2 shows an exemplary situation where plural users are present in an environment and the operation in the manner of the embodiments of the technology described herein can be used.

FIG. 2 shows an exemplary part of an indoor environment 20, in which plural users 21, each having a respective portable electronic device 22 operable to provide an augmented reality display, are present. In accordance with the technology described herein, and as will be discussed further below, the users' respective portable electronic devices may share data and/or the processing burden relating to analysis of the environment 20 for the purpose of providing an augmented reality display, so as to allow each of the devices to provide an augmented reality display in the environment 20 to their respective user in a more efficient manner.

In FIG. 2, the environment 20 is exemplified as being a room, but other environments would, of course, be possible.

As shown schematically in FIG. 2, the portable electronic devices 22 of the users may, e.g., be in the form of head worn devices, such as a headset or glasses, such as an AR head-mounted display, potentially coupled with a mobile phone or other device for processing and communication. Each of the portable electronic devices 22 is operable to, inter alia, perform an augmented reality display environment analysis and an augmented reality display process as illustrated in (and in accordance with the process shown in) FIG. 1, for example.

Figure 3:
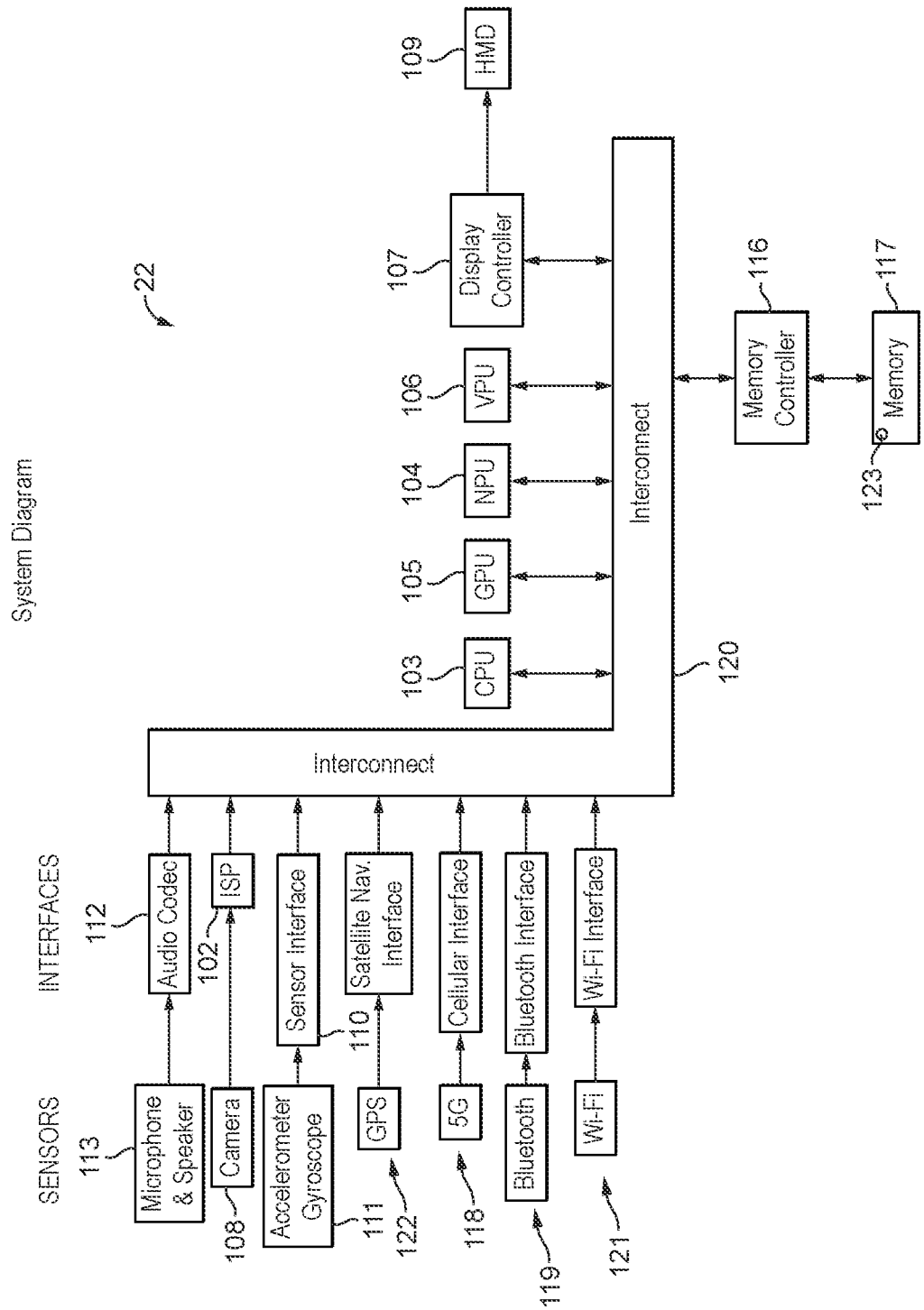
FIG. 3 shows schematically an embodiment of a portable electronic device that is operable in accordance with the technology described herein.

FIG. 3 shows schematically an exemplary portable electronic device that has the necessary capabilities to operate in, and to be operated in, the manner of the present embodiments. Each of the portable electronic devices 22 illustrated in FIG. 2 may thus be in accordance with the system shown in FIG. 3.

As shown in FIG. 3, the portable electronic device 22 includes a number of processors (processing units), including an image signal processor (ISP) 102, a central processing unit (CPU) 103, a neural network processing unit (NPU) 104, a graphics processing unit (GPU) 105, a video processing unit (VPU) 106, and a display controller 107.

As shown in FIG. 3, the image signal processor 102 is in communication with a camera 108 of the portable electronic device 22. Correspondingly, the display controller 107 is in communication with an appropriate head mounted display (HMD) 109 of the portable electronic device 22 (other types of display, such as on a phone or tablet, could also or instead be used, if desired).

The portable electronic device 22 further comprises a sensor interface 110 that is in communication with and receives inputs from inertial sensors, such as an accelerometer and/or gyroscope 111, of the portable electronic device 22.

The portable electronic device 22 further comprises an audio codec 112 that is in communication with a microphone and speaker 113 of the portable electronic device 22, and a memory controller 116 in communication with memory 117 of the portable electronic device 22.

The portable electronic device 22 also includes appropriate wireless communications capabilities, in the present embodiments in the form of a cellular modem 118, a Bluetooth modem 119, and Wi-Fi modem 121, to facilitate communication with other electronic devices, etc. It also includes satellite navigation system (e.g. GPS) functionality 122 for navigation purposes.

The various elements of the portable electronic device 22 communicate with each other via an appropriate interconnect 120.

The various components, functionality, etc. of a portable electronic device 22 as illustrated in FIG. 3 may be present in a single physical device, or, e.g., distributed across several physical devices that together function as the overall device, such as an AR head mounted display, e.g. with a camera, display, microphone system, coupled to a mobile phone with processing and communication-based capabilities, and, optionally, together with some further wearable tactile/haptic feedback device, such as a watch or bracelet.

In this system, the portable electronic device 22 may store an augmented reality application (app) 123 that when executing on the CPU 103 triggers the augmented reality operation in the manner of the present embodiments. Thus, a user of the portable electronic device 22 may activate the augmented reality application 123 when they wish to receive an augmented reality display in an environment.

The operation in the present embodiments relates in particular to the provision of data for the purposes of providing an augmented reality display to a user in situations where there are plural devices present in the environment in question. In particular, data, and in embodiments the processing, relating to the analysis of the environment for the purposes of providing the AR display is shared between devices (where it is appropriate to do that).

Figure 4:
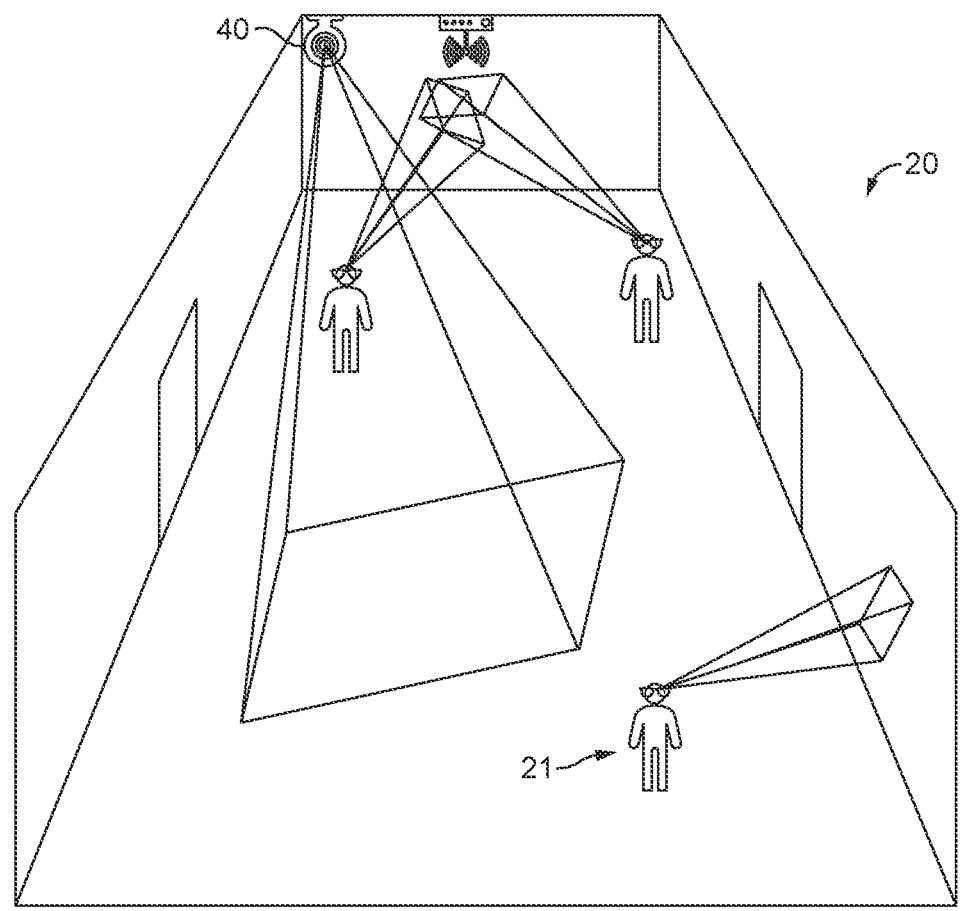
FIGS. 4 and 5 shows exemplary situations where plural users are present in an environment and the operation in the manner of the embodiments of the technology described herein can be used.
Figure 5:
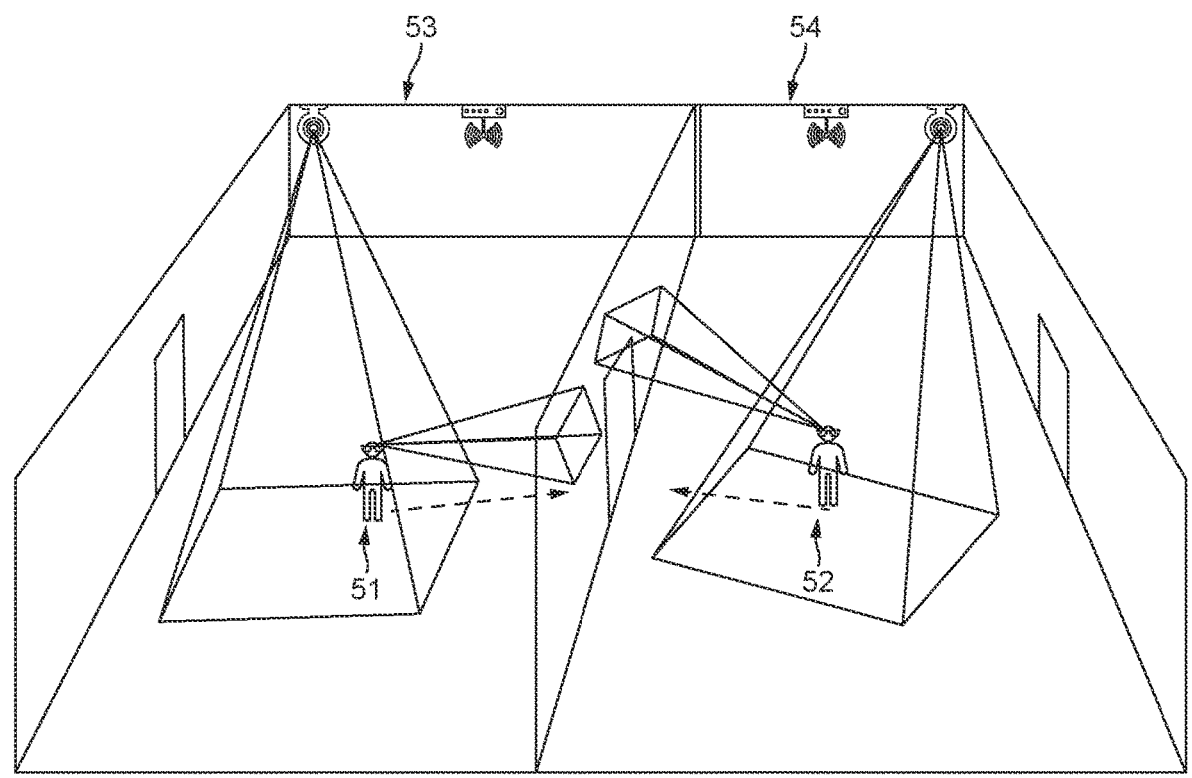

FIGS. 4 and 5 show exemplary situations in which operation in the manner of the present embodiments (of the technology described herein) may be used.

In FIG. 4, there are multiple users with appropriate electronic devices present in the environment 20, with each of the users wishing to provide an augmented reality display of the environment. FIG. 4 also shows the presence of a fixed electronic device 40, such as a security camera, that may also be operable to analyse the environment 20. In this case as will be discussed further below, the analysis of the environment for the purpose of providing the augmented reality display may be subdivided between the different users 21 and the fixed electronic device 40, with the different users (their portable electronic devices) then receiving data relating to the analysis of the environment from the devices, and then using that shared data when providing an augmented reality display to their user. In this way, the processing burden of performing the analysis of the environment for the purposes of providing the augmented reality displays is shared among the plural devices in the environment.

FIG. 5 illustrates another situation in which operation in the manner of present embodiments of the technology described herein may be used. In this case, it is assumed that a first user 51 is leaving a first environment 53 that their portable electronic device has analysed for the purpose of providing an augmented reality display, to enter a second environment 54 that a second user 52 has analysed (and which second user 52 may also be leaving that environment 54). In this case, the existing analysis of the environment 54 performed by the portable electronic device of the user 52 may be provided to the user 51 (to their portable electronic device) as they enter the environment 54, so as to reduce or avoid the user 51 having to perform a (full) analysis of the environment 54 (and correspondingly with respect to providing data from the user 51 to the user 52 relating to the environment 53).

Figure 6:
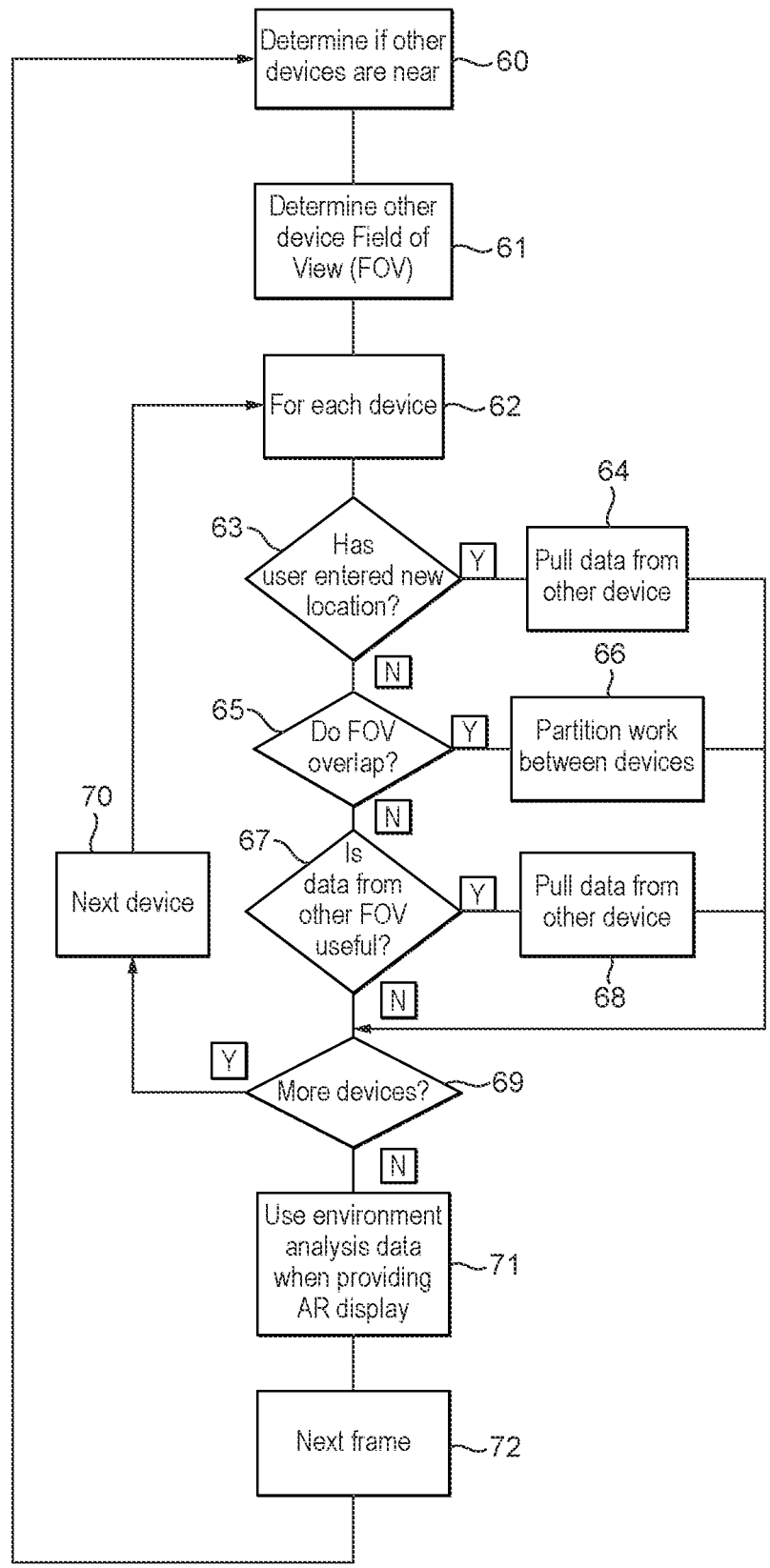
FIGS. 6 and 7 are flow diagrams showing the operation of portable electronic devices in an environment in an embodiment of the technology described herein.
Figure 7:
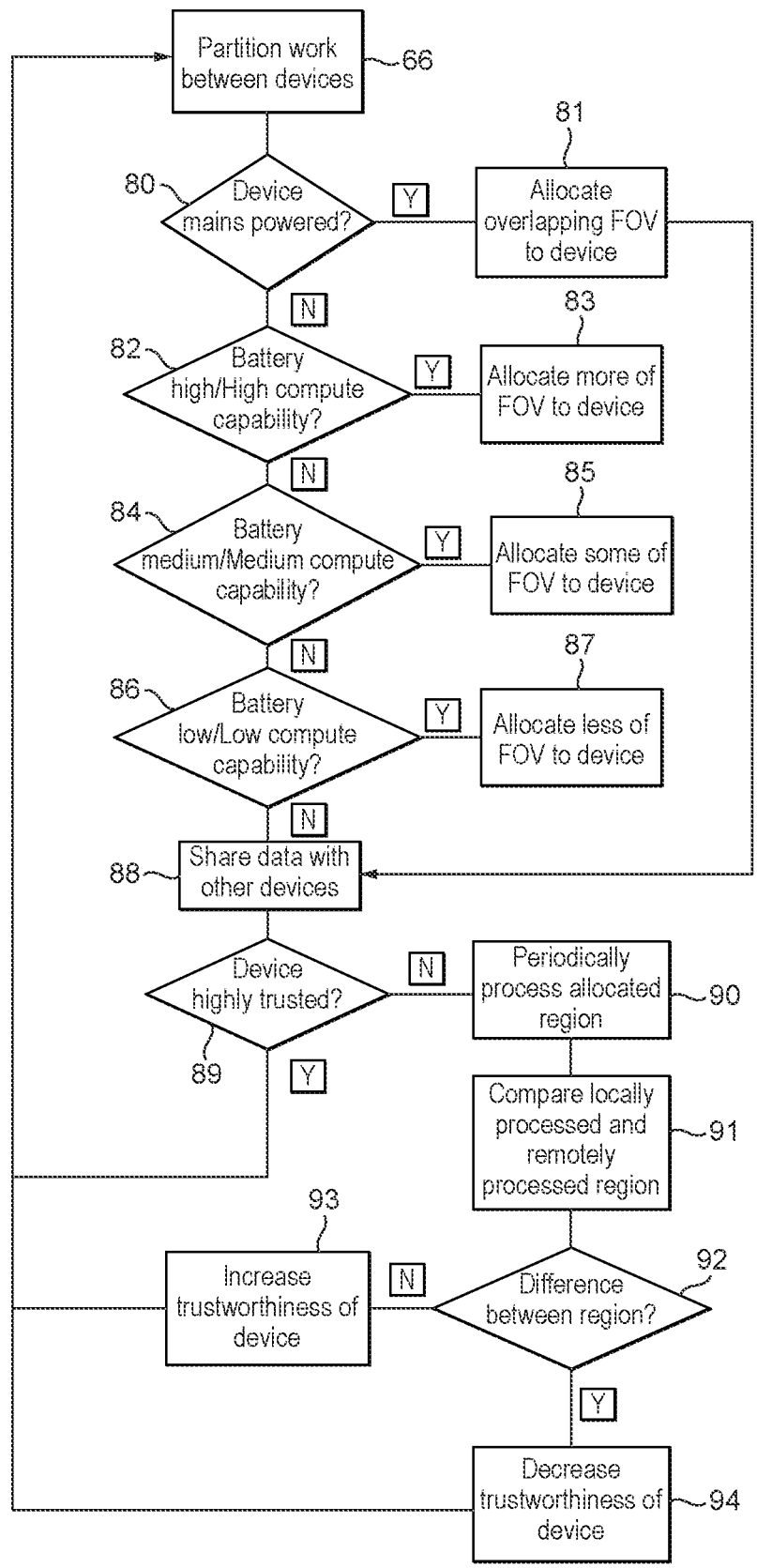

FIGS. 6 and 7 are flowcharts showing in more detail the operation of sharing data relating to the analysis of an environment for the purposes of providing an augmented reality display in the embodiments of the technology described herein. FIG. 6 shows the main "data sharing" operation, and FIG. 7 shows in more detail the partitioning (distributing) of the environment analysis work between different devices in the environment.

As shown in FIG. 6, when, e.g., the user has activated the relevant augmented reality application on their portable electronic device, the portable electronic device (the App) will first determine if there are any other portable electronic devices that are nearby (step 60).

In the present embodiments, this is done by determining whether there are any other portable electronic devices in appropriate Wi-Fi communication range of the portable electronic device. Other arrangements would, of course, be possible.

The respective fields of view of the nearby portable electronic devices are then determined (step 61).

Then, for each device, it is determined whether to share environment analysis data and/or processing with any of the other devices that are nearby in the environment (steps 62, 69 and 70).

To do this, for each device, it is first determined whether the user (the device) has entered a new location (step 63). If so, as shown in FIG. 6, if there is another device having environmental analysis data of that new location, then that environment analysis data is requested from the other device (step 64).

In the event that the user has not entered the new location, it is then determined whether the fields of view of the device in question and any of the other devices that are nearby in the environment overlap or not (step 65). If the fields of view of any of the devices overlap, then the environment analysis work for providing the augmented reality display is partitioned (sub-divided) between the devices having overlapping fields of view (step 66). This operation will be discussed in more detail with reference to FIG. 7.

In the event that there are other devices in the nearby devices in the environment but the fields of view of the devices do not overlap, it is then determined whether any of the environment analysis data from the other devices whose fields of view do not overlap with the device in question would be useful or not (step 67). If so, then again the device in question requests and receives the appropriate environmental analysis data from the other nearby device or devices (step 68).

This operation is repeated for each device (steps 69 and 70), until all the nearby devices have been considered.

This will then complete the environmental analysis for the device in question, and so it will then operate to provide an appropriate augmented reality display to its user (as illustrated in FIG. 1), using the environment analysis it has performed and any such data it has received from another device, as appropriate (step 71). This could comprise, for example, first determining whether to update the display to the user, and, if so, then rendering virtual assets on top of the camera screen from the device to provide an augmented reality display, playing an appropriate audio signal, providing tactile feedback, etc., as desired.

The process then moves on to the next analysis and display sequence (step 72) and so on.

As discussed above in relation to FIG. 6, one embodiment of the operation in the present embodiments is that the environment analysis for the purpose of providing the augmented reality display may be partitioned (subdivided) between different electronic devices in the environment (step 66 in FIG. 6).

FIG. 7 shows this operation in the present embodiments in more detail.

The process starts in FIG. 7 when it has been determined to partition (subdivide) the environment analysis work between plural devices (step 66).

As shown in FIG. 7, the partitioning (subdividing) operation considers a number of different capabilities of the devices in question to determine whether and how to partition the work between the devices.

Thus, as shown in FIG. 7, it is first determined whether any of the devices are mains powered (step 80). If so, then if that device has the appropriate processing capabilities, all of the processing of the overlapping field of view is allocated to that mains powered device (for its field of view) (step 81) (such that other devices that are partially or completely covered by the field of view of the mains powered device can then rely on and use analysis data from the mains powered device for that field of view).

On the other hand, if none of the devices that share the field of view are mains powered, then the distribution of work to the devices that share the field of view is based on the respective battery capacities of the devices and their processing capabilities for performing the analysis of the environment.

In particular, and as shown in FIG. 7, if there is more than one device that has the same field of view, then in the present embodiment, rather than allocating the work in equal shares between those devices (e.g. such that if there were two devices that had the same field of view, the work would be allocated 50:50 between those devices), the allocation of work between the devices that share the field of view takes account of the respective battery capacities of devices and their processing capabilities.

Thus, as shown in FIG. 7, a higher proportion of the analysis work is allocated to devices that have higher processing capabilities (as such devices will be expected to be able to pick up a larger portion of the work), and to devices that have a higher current battery capacity (such that more work will be allocated to devices with a full battery relative to devices with a low battery).

Thus, as shown in FIG. 7, for each device, the state of the battery and their processing (compute) capabilities is considered, and then more or less of the analysis work for the field of view in question is allocated to the device(s) accordingly (steps 82, 83, 84, 85, 86 and 87).

Thus, as shown in FIG. 7, in the case where a device has a higher processing (compute) capability for the analysis and/or a higher battery capacity, more of the processing of the environment within the field of view will be allocated to that device (steps 82 and 83), and, correspondingly, any device that has a low processing (compute) capability and/or a low battery capacity will preferentially be allocated less of the analysis work (at least in the case where there are other devices that more processing can be allocated to), and so on (steps 84, 85, 86 and 87).

Once the respective devices have completed their allocated processing, then the environment analysis data that they generate will be shared with the other devices having an overlapping field of view (step 88).

FIG. 7 also shows a sequence of steps for assessing and ranking the "trustworthiness" of other devices from which environmental analysis data may be received. As shown in FIG. 7, for this process, it is first determined whether the device from which data has been received is highly trusted or not (e.g. according to some trustworthiness rating that has been allocated to the device (step 89)). If the device is indicated to be "highly trusted", then in this embodiment it is assumed that the data received from the device will be reliable, and so no further check or processing relating to the reliability of that device is done.

On the other hand, where the device is not denoted as being "highly trusted", then the device receiving the data from the non-highly trusted device operates to periodically perform environmental analysis corresponding to the environmental analysis performed by the "non-highly trusted" device, and to compare its results with the data received from the "non-highly trusted" device, and to then increase or decrease the trustworthiness ranking of the other device on the basis of that comparison (steps 90, 91, 92, 93 and 94).

In this way, different devices in the environment can "check" the environmental analysis of other devices, and provide and update appropriate "trustworthiness" rankings for the respective devices.

It would also be possible, if desired, to take account of a device's "trustworthiness" when allocating the environmental analysis work between the different devices. For example, a device that has a low "trustworthiness" may not be allocated any work at all, and/or a device with a high "trustworthiness" may be preferentially allocated (and/or allocated more) of the environmental analysis work (assuming that it has the capability and battery capacity required).

The operation shown in FIGS. 6 and 7 is repeated whenever any appropriately equipped portable electronic device is to provide an augmented reality display in an environment, to determine whether and when to share data relating to analysis of the environment with other devices in the environment.

As will be appreciated by those skilled in the art, various modifications, changes, additions and deletions to the described embodiments would be possible, if desired.

For example, it would be possible to provide some form of more centralised management and control of the data sharing, e.g. via a centralised and/or external controller that, e.g., receives information from respective portable (or other) devices, and correspondingly distributes that data to the devices. The "central" controller electronic device could, e.g., be fixed in the environment, and receive analysis data from electronic devices in the environment and distribute that data to other devices in the environment, as appropriate. In this case, the centralised controller device could curate a "current" (latest) model of the environment, with devices reporting the environment data they are generating to the controller, and existing environment data being fetched from the controller. The centralised controller could also perform any desired trustworthiness checks, ranking updates, etc.

It can be seen from the above that the technology described herein, in embodiments, comprises a method of and apparatus that can reduce the amount of computation required to analyse an environment and therefore reduce the processing burden and power consumption for individual AR devices.

This is achieved, in embodiments of the technology described herein at least, by, when there are multiple devices in the same environment that are active to analyse that environment for AR purposes, sharing the results of the analysis (and potentially the analysis itself) between the multiple devices.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto

The invention claimed is:

1. A method of operating a portable electronic device that is to provide an augmented reality display to a user in an environment, the method comprising:
   determining whether there are any other electronic devices which are portable and configured to analyse the environment for augmented reality display purposes that are near to the portable electronic device; and
   when it is determined that there is another electronic device which is portable and configured to analyse the environment for augmented reality display purposes that is near to the portable electronic device:
      determining whether to provide data relating to the analysis of the environment for augmented reality display purposes from the another electronic device which is portable to the portable electronic device; and
   when it is determined to provide data relating to the analysis of the environment for augmented reality display purposes from the another electronic device which is portable to the portable electronic device, providing data relating to the analysis of the environment for augmented reality display purposes from the another electronic device which is portable to the portable electronic device; and
   the portable electronic device using the provided data relating to the analysis of the environment for augmented reality display purposes when providing an augmented reality display to a user of the portable electronic device;
   wherein the providing of data relating to the analysis of the environment for augmented reality display purposes from the another electronic device which is portable to the portable electronic device comprises:
   determining whether one or both of the portable electronic device and the another electronic device which is portable should perform an analysis of the environment for augmented reality display purposes;
   allocating the processing relating to the analysis of the environment for augmented reality display purposes to one or both of the another electronic device which is portable and the portable electronic device on the basis of the determination; and
      the another electronic device which is portable and/or the portable electronic device then performing their so-allocated processing relating to the analysis of the environment and then sending the resulting analysis data from that processing to the other device.

2. The method of claim 1, comprising:
   determining that there is another electronic device configured to analyse the environment for augmented reality display purposes that is near to the portable electronic device when the portable electronic device determines that it can communicate with the another electronic device using a particular wireless communication protocol.

3. The method of claim 1, comprising:
   determining whether to provide data relating to the analysis of the environment from the another electronic device to the portable electronic device based on one or more of:
   the devices' locations in the environment;
   the devices' fields of view in the environment;
   whether the another electronic device already has data relating to the analysis of the environment that it can share; and
   a measure of the trustworthiness of any analysis performed by the another electronic device.

4. The method of claim 1, comprising:
   determining how to allocate the processing between the devices based on one or more of:
   the devices' locations in the environment;
   the devices' fields of view in the environment;
   the capabilities of the devices for analysing the environment and generating data in relation thereto;
   the devices' processing capabilities;
   the devices' sensor capabilities;
   the devices' remaining battery level;
   whether the devices are mains powered;
   the analysis to be performed; and
   a measure of the trustworthiness of any analysis performed by the devices.

5. The method of claim 1, wherein the data relating to the analysis of the environment is provided between the devices as a peer-to-peer operation between the respective devices directly.

6. The method of claim 1, comprising the devices sending data relating to the analysis of the environment to a central distributing electronic device, which central device then distributes that data to electronic devices in the environment.

7. The method of claim 1, wherein the portable electronic device controls its use of data received from another electronic device based on one or more of:
   a trustworthiness measure of the device from which the data is received; and
   the age of the data that is received from the device.

8. The method of claim 1, further comprising an electronic device checking data received from another electronic device, to determine whether the another device's analysis is trustworthy.

9. The method of claim 1, wherein there are three or more electronic devices configured to analyse the environment for augmented reality display purposes that are present in the environment, and the method comprises:
   distributing the processing relating to the analysis of the environment for augmented reality display purposes between the three or more devices, with the devices then sharing the resulting data relating to the analysis of the environment for the purposes of providing an augmented reality display to their respective users.

10. A method of operating a system for providing augmented reality display to users in an environment, the system comprising:
   a plurality of portable electronic devices each configured to analyse an environment for augmented reality display purposes, and each configured to provide an augmented reality display to a user in an environment;
   the method comprising:
      determining whether two or more of the portable electronic devices configured to analyse an environment for augmented reality display purposes are near to each other; and
      when it is determined that two or more of the portable electronic devices configured to analyse the environment for augmented reality display purposes are near to each other:
         determining whether to share data relating to the analysis of the environment for augmented reality display purposes between two or more of the two or more portable electronic devices configured to analyse an environment for augmented reality display purposes; and when it is determined to share data relating to the analysis of the environment for augmented reality display purposes between two or more of the two or more portable electronic devices configured to analyse an environment for augmented reality display purposes, sharing data relating to the analysis of the environment for augmented reality display purposes between two or more of the two or more portable electronic devices configured to analyse an environment for augmented reality display purposes; and one or more of the two or more portable electronic devices configured to analyse the environment for augmented reality display purposes using data relating to the analysis of the environment for augmented reality display purposes they have received when providing an augmented reality display to a user;

wherein the sharing of data relating to the analysis of the environment for augmented reality display purposes between two or more of the two or more portable electronic devices determined to be near to each other comprises:

determining whether one or more of the two or more portable electronic devices should perform an analysis of the environment for augmented reality display purposes;

allocating the processing relating to the analysis of the environment for augmented reality display purposes to one or more of the two or more portable electronic devices on the basis of the determination; and one or more of the two or more portable electronic devices then performing their so-allocated processing relating to the analysis of the environment and then sending the resulting analysis data from that processing to one or more of the two or more portable electronic devices.

11. A portable electronic device that is configured to provide an augmented reality display to a user in an environment, the portable electronic device comprising:

a processing circuit configured to:

determine whether there are any other electronic devices which are portable and configured to analyse the environment for augmented reality display purposes that are near to the portable electronic device; and when it is determined that there is another electronic device which is portable and configured to analyse the environment for augmented reality display purposes that is near to the portable electronic device:

determine whether to use data relating to the analysis of the environment for augmented reality display purposes from the another electronic device which is portable when the portable electronic device is providing an augmented reality display to a user; and when it is determined to use data relating to the analysis of the environment for augmented reality display purposes from the another electronic device which is portable, receive data relating to the analysis of the environment for augmented reality display purposes from the another electronic device which is portable;

wherein the processing circuit is configured to:

determine whether one or both of the portable electronic device and the another electronic device which is portable should perform an analysis of the environment for augmented reality display purposes; and allocate the processing relating to the analysis of the environment for augmented reality display purposes to one or both of the another electronic device which is portable and the portable electronic device on the basis of the determination; and the processing circuit configured to provide an augmented reality display to a user of the portable electronic device using the data relating to the analysis of the environment for augmented reality display purposes received from the another electronic device.

12. The device of claim 11, wherein the processing circuit is configured to:

determine that there is another electronic device configured to analyse the environment for augmented reality display purposes that is near to the portable electronic device when the portable electronic device determines that it can communicate with the another electronic device using a particular wireless communication protocol.

13. The device of claim 11, wherein the processing circuit is configured to:

determine whether to use data relating to the analysis of the environment from the another electronic device to the portable electronic device based on one or more of:

the device's location in the environment;
the device's field of view in the environment;
whether the another electronic device already has data relating to the analysis of the environment that it can share; and
a measure of the trustworthiness of any analysis performed by the another electronic device.

14. The device of claim 11, wherein the processing circuit is configured to:

determine how to allocate the processing between the devices based on one or more of:

the devices' locations in the environment;
the devices' fields of view in the environment;
the capabilities of the devices for analysing the environment and generating data in relation thereto;
the devices' processing capabilities;
the devices' sensor capabilities;
the devices' remaining battery level;
whether the devices are mains powered;
the analysis to be performed; and
a measure of the trustworthiness of any analysis performed by the devices.

15. The device of claim 11, wherein the data relating to the analysis of the environment is provided between the devices as a peer-to-peer operation between the respective devices directly.

16. The device of claim 11, wherein the processing circuit is configured to send data relating to the analysis of the environment to a central distributing electronic device, which central device then distributes that data to electronic devices in the environment.

17. The device of claim 11, wherein the portable electronic device is configured to control its use of data received from another electronic device based on one or more of:

a trustworthiness measure of the device from which the data is received; and
the age of the data that is received from the device.

18. The device of claim 11, wherein the processing circuit is further configured to check data received from another electronic device, to determine whether the another device's analysis is trustworthy.

19. A non-transitory computer readable storage medium comprising computer software code which when executing on a data processor performs a method of operating a portable electronic device that is to provide an augmented reality display to a user in an environment, the method comprising:

determining whether there are any other electronic devices which are portable and configured to analyse the environment for augmented reality display purposes that are near to the portable electronic device; and when it is determined that there is another electronic device which is portable and configured to analyse the environment for augmented reality display purposes that is near to the portable electronic device:

determining whether to provide data relating to the analysis of the environment for augmented reality display purposes from the another electronic device which is portable and to the portable electronic device; and when it is determined to provide data relating to the analysis of the environment for augmented reality display purposes from the another electronic device which is portable and to the portable electronic device, providing data relating to the analysis of the environment for augmented reality display purposes from the another electronic device which is portable and to the portable electronic device; and the portable electronic device using the provided data relating to the analysis of the environment for augmented reality display purposes when providing an augmented reality display to a user of the portable electronic device;

wherein the providing of data relating to the analysis of the environment for augmented reality display purposes from the another electronic device which is portable to the portable electronic device comprises:

determining whether one or both of the portable electronic device and the another electronic device which is portable should perform an analysis of the environment for augmented reality display purposes;

allocating the processing relating to the analysis of the environment for augmented reality display purposes to one or both of the another electronic device which is portable and the portable electronic device on the basis of the determination; and the another electronic device which is portable and/or the portable electronic device then performing their so-allocated processing relating to the analysis of the environment and then sending the resulting analysis data from that processing to the other device.

\* \* \* \* \*